(12) United States Patent
Miao et al.

(10) Patent No.: US 10,417,552 B2
(45) Date of Patent: Sep. 17, 2019

(54) CURIOSITY-BASED EMOTION MODELING METHOD AND SYSTEM FOR VIRTUAL COMPANIONS

(71) Applicant: NANYANG TECHNOLOGICAL UNIVERSITY, Singapore (SG)

(72) Inventors: Chunyan Miao, Singapore (SG); Qiong Wu, Singapore (SG); Zhiqi Shen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 806 days.

(21) Appl. No.: 14/668,271

(22) Filed: Mar. 25, 2015

(65) Prior Publication Data

US 2015/0278676 A1    Oct. 1, 2015

Related U.S. Application Data

(60) Provisional application No. 61/970,051, filed on Mar. 25, 2014.

(51) Int. Cl.
*G06N 3/00* (2006.01)
*G06N 20/00* (2019.01)

(52) U.S. Cl.
CPC ............. *G06N 3/006* (2013.01); *G06N 20/00* (2019.01)

(58) Field of Classification Search
None
See application file for complete search history.

(56) References Cited

U.S. PATENT DOCUMENTS

| 2004/0181376 A1* | 9/2004 | Fables .................... G06N 3/004 703/6 |
| 2012/0226650 A1* | 9/2012 | Witchey ................. G06N 5/04 706/50 |
| 2013/0268468 A1 | 10/2013 | Vijayaraghavan et al. |

OTHER PUBLICATIONS

Qiong Wu et al., "Modeling Curiosity-Related Emotions for Virtual Peer Learners". IEEE Computational Intelligence Magazine. Apr. 11, 2013.

* cited by examiner

*Primary Examiner* — Kakali Chaki
*Assistant Examiner* — Michael Zidanic
(74) *Attorney, Agent, or Firm* — Sughrue Mion, PLLC

(57) ABSTRACT

The invention proposes that a software agent for assisting a user in a virtual environment defined by a first concept map, maintains a record of its experiences in the form of a second concept map. The concept maps are compared to obtain a measure of stimulation. The measure of stimulation is used to derive a comparison value indicative an emotional state of the user, and the comparison value is used in a reward function to guide the behavior of the software agent.

7 Claims, 1 Drawing Sheet

CURIOSITY-BASED EMOTION MODELING METHOD AND SYSTEM FOR VIRTUAL COMPANIONS

FIELD OF THE INVENTION

The present invention relates to a virtual companion for assisting a human user to perform a task. In one example, the task is selection of products to be purchased from a retailer.

BACKGROUND OF THE INVENTION

In the past two decades, curiosity has successfully attracted attention of numerous researchers in the field of Artificial Intelligence.

From the machine learning perspective, curiosity has been proposed as an algorithmic principle to focus learning on novel and learnable regularities, in contrast to irregular noise. For example, Schmidhuber [6] introduced curiosity into model-building control systems. In his work, curiosity is modeled as the prediction improvement between successive situations and is an intrinsic reward value guiding the selection of training examples such that the expected performance improvement is maximized. In autonomous robotic developmental systems, Oudeyer and Kaplan [7] proposed an Intelligent Adaptive Curiosity (IAC) mechanism and modeled curiosity as the prediction improvement between similar situations instead of successive situations.

Curiosity has also been modeled in exploratory agents to explore and learn in uncertain domains. For example, Scott and Markovitch [3] introduced curiosity for intelligent agents to learn unfamiliar domains. They adopted a heuristic that "what is needed is something that falls somewhere between novelty and familiarity", where novelty is defined as a measure of how uncertain the agent is about the consequence of a stimulus. Uncertainty is implemented as Shannon's entropy of all the possible outcomes to a stimulus. The system can learn a good representation of the uncertain domain because it will not waste resources on commonly occurred cases but concentrate on less common ones. Another work is done by Macedo and Cardoso [1], who modeled curiosity in artificial perceptual agents to explore uncertain and unknown environments. This model relies on graph-based mental representations of objects and curiosity is implemented as the entropy of all parts that contain uncertainty in an object.

In creative agents, curiosity has been modeled as an intrinsic evaluation for novelty. For example, Saunders and Gero [8] developed a computational model of curiosity for "curious design agents" to search for novel designs and to guide design actions. A Self-Organizing Map (SOM) is employed as the "conceptual design space" for the agent. For a given input, novelty is implemented as a measure of cluster distance. This measure reflects the similarity between newly encountered design patterns with previously experienced ones. In Merrick and Maher's model [2], they utilized an improved SOM model named Habituated Self-Organizing Map (HSOM) to cluster similar tasks and novelty is calculated by a habituation function.

To summarize, in existing works, curiosity has been integrated into agents' learning modules and decision modules to enhance their performance. However, these agents can hardly be perceived to be believable by a human observer. There are two main reasons for this: (1) existing models lack a comprehensive psychological theory as background, and (2) agents perceive the environment on the machine language level (feature-based knowledge representation) rather than on the human language level (semantic knowledge representation).

SUMMARY OF THE INVENTION

The present invention aims to provide a new and useful software agent (virtual companion) to help a human agent operate in a virtual environment (VE) defined by a concept map.

Here, the term concept map (CM) is used to mean a graph-based semantic knowledge representation in which related concepts are linked. It is a directed graph which comprises nodes, and edges interconnecting nodes. CMs were originally derived from the learning theory of constructivism. CMs have been widely applied in classrooms for knowledge organization [9] and much educational software for modeling the minds of students [10], [11].

In general terms, the invention proposes that the software agent maintains a record of its experiences in the form of a memory ("agent's memory") which is also structured as a concept map. The CM defining the virtual environment and the one defining the agent's memory are compared to obtain a measure of stimulation level ("stimulation measure"). The measure of stimulation level is used to derive a comparison value which serves as a model of an "emotional state" of the user, and the comparison value is used in a reward function to guide the behavior of software agent. The behaviour of the agent may then serve as a guide for the behavior of the user.

Thus, the user can explore the virtual environment accompanied by the software agent. The stimulation measure is designed to model the "curiosity" the user is likely to experience. Thus, the software agent may be thought of as a "curiosity agent" which determines simulation level and correlates it to the emotion of user to gather feedback so that an appropriate action/recommendation can be proposed.

In one example, the virtual environment may be a retail environment, such as an e-commerce website, and in this case the agent influences the user by suggesting products (goods and/or services) for the user to purchase. Thus, the agent may influence sales.

The inventive concept provides a number of technical advantages.

First, since the agent's memory is structured as a concept map, i.e. a semantic knowledge representation, (using all or a subset of the same concepts used to define the virtual environment) the virtual companion can perceive the VE at the same level as a human being does. This is in contrast to the feature-based knowledge representations most commonly utilized in the earlier learning models described above. In other words, the embodiments of the invention employ a semantic knowledge representation that can easily be interpreted by humans and is more suitable for designing virtual companions.

Second, the stimulation measure may be designed combining values which respectively mimic three of the dimensions of information associated with curiosity proposed by Berlyne [4], specifically novelty, conflict and complexity. The calculation of the stimulation measure may be based on an extension and transformation of Tversky's ratio model [12].

Third, the invention makes it possible to model explicitly three curiosity-related emotions: boredom, curiosity and anxiety. They are appraised based on Wundt's theory [5], by adopting two thresholds to compare with the stimulation measure. This divides the spectrum of stimulation into three emotion regions.

Finally, curiosity-related emotions are utilized as intrinsic reward functions to guide the virtual companion's learning of behavior strategy. This is inspired by the frequently adopted assumption in intrinsically motivated reinforcement learning that a human decision-making process consists of maximizing positive emotions and minimizing negative emotions [13], [14]. Another function of curiosity-related emotions is their influence on the agent's knowledge acquisition ability. This is inspired by human nature, where our learning ability can be regulated by different emotion states [15].

Modeling curiosity-based emotions for virtual companions can benefit agents at two levels: the individual level and the social level. At the individual level, agents with curiosity are able to perform self-directed learning and evolve into better selves. At the social level, agents with curiosity can promote better agent-human relationships. As suggested in human psychology, curiosity plays an important role in promoting the intimacy of interpersonal relationships in social context. A curious companion can be more responsive; may infuse more novel twists of excitement into interactions, and might induce a natural flow of engagement between the interaction discourses. Beside, understanding users' curiosity and properly infusing curiosity stimuli into the human-computer interaction process can potentially help virtual companions to achieve persuasive goals. For example, if a sales agent can successfully elicit the customer's curiosity in a product, there will be a higher chance for this product to be sold.

The invention may be expressed as a method. Alternatively, it may be expressed as a computer system, having a data storage device and storing program instructions operative by a processor of the computer system to cause the processor to perform the method.

The method is preferably performed automatically, that is substantially without human involvement, except optionally for initiation by the user (e.g. by turning the computer on) and the actions performed by the user in the virtual environment.

BRIEF DESCRIPTION OF THE FIGURES

An embodiment of the invention will now be described for the sake of example only with reference to the following figures in which.

DETAILED DESCRIPTION OF THE EMBODIMENT

Figure 1:
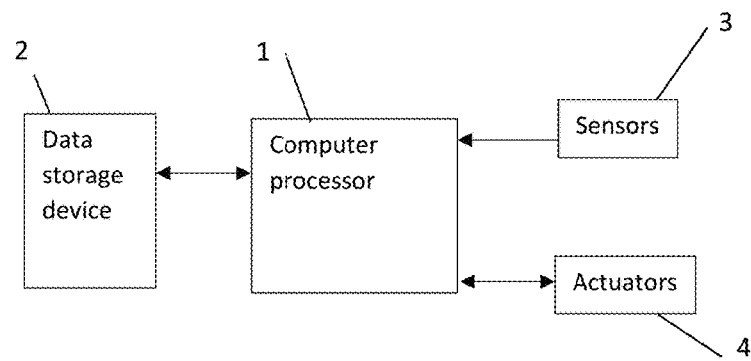
FIG. 1 depicts schematically a computer system which is an embodiment of the invention.

FIG. 1 depicts schematically a computer system which is an embodiment of the invention. The system includes a processor 1, which has access to a database stored in a data storage device 2. The processor 1 receives input from one or more sensors 3, and generates and sends control signals to one or more actuators 4. The computer processors may further receive input from the actuator(s) 4 indicating the state of the actuators 4, such as data indicating a stored energy level in the actuators.

The computer system may be a stationary computer system, such as a desk-top system. In one example, the computer system may also be used by the user to interact with a remote server which implements an e-commerce website.

The data storage device 2 stores program instructions operative to cause the processor to perform a method as described below with reference to FIG. 2, to implement a software agent referred to as curious companion. The data storage device 2 also stores a first concept map (that is, a graph-based representation of a plurality of concepts represented as nodes, with related concepts being connected by edges) representing a virtual environment. It further stores a second concept map representing the history of a software agent as it tracks the activity of the user. The second concept map uses a subset of the concepts of the first concept map.

The sensor(s) 3 are interface(s) between the agent and the environment and/or the human user. The sensor(s) collect information about the environment and the human user. The information about the environment may include various environment states (e.g., that a virtual door is open or close, a virtual plant is saved or dead, that a product has been sold or not etc.). The information about the human user includes user activities (e.g., that the user accepts or rejects a task, that the user clicks, etc.) and user states (e.g., emotion, location in the virtual environment, etc.). The sensor(s) may include means for determining the level of activity of the user (e.g. to determine that the user's activity is low, such that he may be "stuck" and could benefit from a suggestion by the software agent).

The term actuator 4 is used in a general sense to include both mechanical actuators, and screen(s) or sound generating unit(s) for transmitting information to the user. That is, the term is used to include any interface between the computer system and the human user which permits an output of the computer system to be made to affect the user. In other words, an actuator 4 is the converse of a sensor: the sensor(s) 3 are for collecting inputs for the system, and the actuator(s) 4 are for presenting outputs of the system.

Particularly in the case that the actuator is a mechanical actuator, it may store data 14 indicating its physical constraints, e.g. the amount of energy stored in a power supply for the actuator. All the agent's actions cost energy, which can be restored through resting. Hence, the agent needs balance its energy usage to achieve maximum utility.

Figure 2:
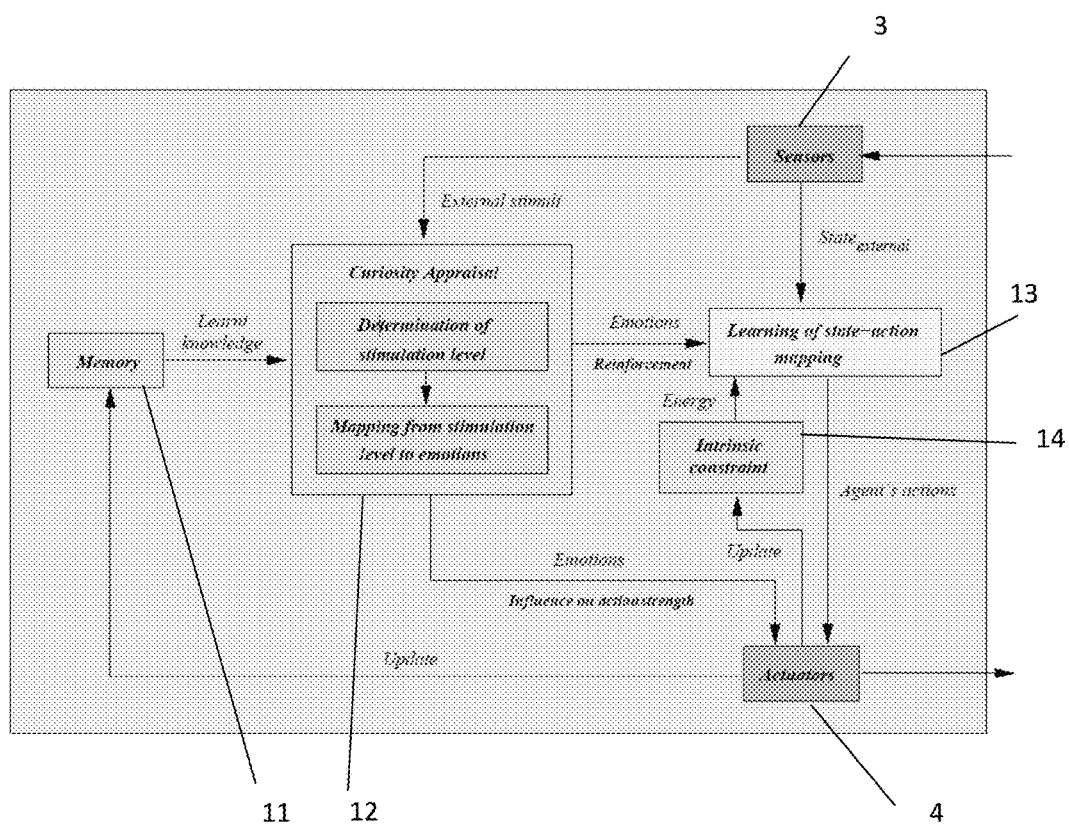
FIG. 2 depicts the flow of information in software units of the embodiment.

The architecture of the software agent ("curious companion") is shown in FIG. 2, and includes elements labeled 11, 12, 13 and 14. Using the sensor(s) 3, the curious companion can sense external states (e.g. in a learning zone) and receive external stimuli (e.g. learning tasks). The external states are descriptions about the states of objects in the environment, e.g., a virtual door is open or closed, the human user is in a learning zone or non-learning zone, a product is sold or not, a learning task is detected or not. The external stimuli (i.e., curiosity stimuli) are objects in the environment that can initiate the appraisal of curiosity, e.g., a door, a product, learning tasks, etc.

The external stimuli can trigger unit 12 of the curious companion to perform curiosity appraisal. The curiosity appraisal uses the first concept map, and the second concept map which encodes the knowledge about the history of the system stored in the agent's memory. The curiosity appraisal consists of two steps:

(i) Determination of stimulation level. This is done by calculating three curiosity-stimulating factors (based on Berlyne's theory), including novelty, conflict, and complexity. These are combined to yield a stimulation measure. and (ii) Mapping from stimulation level to "emotions" (i.e. to indicate that the software agent which is analogous to an emotion in a human being). This is done (motivated by Wundt's theory), by comparing the stimulation measure to two thresholds, to obtain a comparison value, indicative of an emotion. Too low a level of stimulation (i.e. below the lower threshold) leads to boredom, and is encoded using a comparison value taking a negative value. Too high a level of stimulation leads to anxiety (i.e. above the upper threshold), and again is encoded by a comparison value taking a negative value. Only a level of stimulation between the two thresholds leads to a positive comparison value. This indicates optimal stimulation which leads to curiosity.

Emotions derived from the curiosity appraisal process, and encoded by the comparison value, serve two functions:

(1) They are used by a unit 13 for a learning process for state-action mapping. The unit 13 also receives and uses the data 14 indicating the constraints on the actuator. The comparison value is used as a reinforcement value for the learning of the state-action mapping. A negative comparison value indicative of boredom and anxiety gives a negative reinforcement, whereas a positive comparison value indicative of curiosity gives a positive reinforcement.

(2) The comparison value is an input to the actuator(s) 4 themselves, to influence the action strengths for the actions performed by actuators 4. In one example, learning itself is considered a type of actuator. Learning is an action which incorporates previously unknown concepts into the virtual companion agent's concept maps. The actuator determines "depth of learning". In this case, the actuator is a software implementation, which is just code, and does not have a physical implementation, such as an arm.

Actions (e.g. explore) derived from the learning of state-action mapping module are performed by the actuators 4. This is done, and there is a process of updating the variable 14 which records the intrinsic constraints of the agent (e.g. the amount of energy remaining.).

Several applications of the curiosity companion exist. Firstly, they can be applied in virtual companions for e-commerce to provide users with better shopping experiences. Firstly, a shopping companion with curiosity is able to detect potential interesting commercial products and recommend them to users. Secondly, through curiosity-related emotions, a shopping companion may influence users' attitude toward the commercial product and impact their decision-making process. Hence, a shopping companion with curiosity and its related emotions may provide the users with a more convenient and enjoyable shopping experience, as well as benefitting the product providers by selling more products. A possible implementation is to use the concept maps of the virtual environment to describe the key features of each product. The virtual agent will record the previous purchased product by the user to form its own taste for product, which is similar to the user. Then, the virtual agent will make curiosity appraisal towards new products based on the concept map description of the new product and the concept map description of its own taste. If a product makes the virtual agent curious, the agent will recommend this product to the user because it may make the user feel curious as well. The actuator may be realized as a message sender to send recommended products to users through a message on the screen or a message on the mobile. It may also include sound alerts, animations and other visual effects.

In another alternative, the embodiment may be used to provide a companion to accompany a student in a learning task defined by a concept map. In this case the virtual environment is a virtual learning environment (VLE). The companion is able to suggest elements of the learning task to the student according to which is likely give the greatest reward, by virtue of being one in which the student is most curious. The actuator in this case is virtual, and models the ability of the system (i.e. the virtual agent) to learn. This process itself is a model to mimic a real human student.

In another alternative, the embodiment may be used as a curious companion for a person, such as an elderly person, that recommends interesting news, music, or product to the person.

In another alternative, the embodiment may be used as a curious storytelling companion for children that can makeup interesting stories based on curiosity-stimulating factors.

Although only a single embodiment of the invention has been described, many variations are possible within the scope and spirit of the invention.

APPENDIX

The operation of the embodiment is now explained in mathematical terms.

A) Memory and Knowledge Representation

We adopt Concept Maps (CMs) to represent the semantic knowledge in both learning tasks (knowledge to be learnt) and the agent's memory (knowledge already learnt). As mentioned in the main text, a CM is a graph-based representation that describes semantic relationships among concepts. It can be represented by a directed graph with nodes and edges interconnecting nodes. We formalize the symbolic representation of CMs as follows:

A CM M with n concepts, is defined as: $M=\{C,L\}$:

$C=\{c_i|c_i \in P_c;\ i=1, 2, \ldots, n\}$ represents the concepts, where $P_c$ is a set of predefined concepts in VLE;

$L=\{l_{ij}|l_{ij} \in P_l \cup \{null\};\ i=1, 2, \ldots, n;\ j=1, 2, \ldots n\}$ represents the labels describing the relationships between two concepts, where $P_l$ is a set of predefined labels in VLE.

Based on the above definition, in CMs, concepts and relationships are all semantic expressions. A relationship in M is defined as a knowledge point, denoted by $k=(c_i,c_j,l_{ij})$, where $l_{ij} \neq null$. Knowledge in both learning tasks and the agent's memory is represented by CMs. Each learning task can be represented by a set of knowledge points, denoted by $T=\{k_1, k_2, \ldots, k_m\}$. Knowledge related to learning task T that has been learnt by the virtual peer learner is represented by $T_s$, contained in the agent's memory.

B) Curiosity Appraisal

Based on psychological theories, curiosity appraisal is modeled as a two-step process: determination of stimulation level and mapping from the stimulation level to emotions.

1. Determination of Stimulation Level

Each learning task in VLE is considered as a stimulus. As defined in the previous section, for each learning task, there is a set of knowledge points associated, denoted by $T=\{k_1, k_2, \ldots, k_m\}$. This set of knowledge points are intended to be learnt by the agent upon finishing the learning task.

According to Berlyne, four factors: novelty, uncertainty, conflict and complexity, can stimulate curiosity. With the CM-based knowledge representation, the most salient factors that can be appraised in a learning task (stimulus) include novelty, conflict and complexity. Novelty and conflict can be reflected in the dissimilarity between knowledge points to be learnt in the learning task T and learnt ones in the agent's memory T. Complexity can be reflected by the total amount of knowledge points intended to be learnt in the learning task T. Next, the appraisal of novelty, conflict and complexity is discussed in detail.

We define a novel knowledge point in T as the knowledge point that is a member of T but does not have a corresponding knowledge point in $T_s$, with the same order of concepts. This indicates that the agent has not learnt the knowledge point before. All novel knowledge points in T are kept in the novelty set, denoted by $T \doteq T_s$.

A conflicting knowledge point in T is defined as the knowledge point that is a member of T and has a corresponding knowledge point in $T_s$ with same order of concepts, but with different labels. This indicates that the agent understands the knowledge point differently from the learning task. All conflicting knowledge points in T are kept in the conflict set, denoted by $T \simeq T_s$.

It can be deduced from the definition that the conflict set operator $\simeq$ is symmetric, i.e. $T \simeq T_s = T_s \simeq T$.

It can also be deduced that set difference $T - T_s$ equals to the union of novelty set and conflict set, i.e. $T - T_s = (T \doteq T_s) \cup (T \simeq T_s)$. Hence, the set difference of from T to $T_s$ contains two types of information in this context: novelty and conflict. In order to measure the level of combined novelty and conflict, we extend Tversky's classic set similarity measurement, referred to as the ratio model [12], by introducing asymmetry to the novelty and conflict information contained in the set difference.

According to the ratio model, the similarity between two sets A and B can be represented by [12]:

$$S(A, B) = \frac{f(A \cap B)}{f(A \cap B) + \alpha f(A - B) + \beta f(B - A)}, \alpha, b \geq 0$$

where f is a scale function, and $\alpha$, $\beta$ define the degree of asymmetry. According to Tversky, f is usually the cardinality of a set, reflecting the salience or prominence of various members in the set. Also, f satisfies additivity, i.e. $f(X \cup Y) = f(X) + f(Y)$. In the ratio model, S(A,B) is interpreted as the degree to which A is similar to B, where A is the subject of comparison and B is the reference. One naturally focuses on the subject of comparison. Hence, the features of the subject are usually weighed more heavily than the features of the reference, i.e. $\alpha \rangle \beta$.

Next, we extend Tversky's ratio model to introduce asymmetric measure to the novelty and conflict subsets in the set difference as follows:

Let:

$$g(A - B) = \delta f(A \doteq B) + \xi f(A \simeq B), \delta, \xi \geq 0$$

and $$S(A, B) = \frac{f(A \cap B)}{f(A \cap B) + \alpha g(A - B) + \beta g(B - A)}, \alpha, b \geq 0$$

where g(A-B) is a function of the set difference from A to B, with asymmetry introduced to the novelty and conflict subsets. The parameters $\delta$ and $\xi$ give importance to novelty and conflict respectively and determine the degree of asymmetry. Thus, S(A,B) measures the similarity between set A and B, with asymmetry between the set difference: A-B and B-A (determined by $\alpha$ and $\beta$), as well as asymmetry between the two types of information contained in the set difference: novelty and conflict (determined by $\delta$ and $\xi$).

S(A,B) gives the measure of similarity between two sets. However, novelty and conflict are contained in the dissimilarity between two sets, as the union of novelty and conflict forms the set difference, i.e. $T - T_s = (T \doteq T_s) \cup (T \simeq T_s)$. Hence, in order to measure novelty and conflict, we define the dissimilarity D(A,B) between two sets: D(A,B)=1-S(A,B). D(A,B) is the normalized value containing the dissimilarity information between sets A and B.

Based on this definition, the difference between knowledge points in task T and agent's memory $T_s$ can be represented by: $D(T,T_s) = 1 - S(T,T_s)$.

In the appraisal of curiosity, T is the subject of comparison and $T_s$ is the reference. Here, we give full importance to the subject T, because only the difference from T to $T_s$, i.e. $T - T_s$, reflects the stimulus's information, consisting of novelty and conflict. The difference from $T_s$ to T, i.e. $T_s - T$, also contains two sources of information: (1) learnt knowledge points that are not given in the learning task, i.e. $T \doteq T_s$, and (2) conflicting knowledge points, i.e. $T \simeq T_s$. However, $T \doteq T_s$ does not reflect the stimulus's property but rather the agent's knowledge not given in task T. Also, $T \simeq T_s$ has been considered in $T - T_s$ (due to the symmetry of operator $\simeq$). Hence, in the appraisal of curiosity, we assign $\alpha = 1$ and $\beta = 0$. As a result, the difference between T and $T_s$ can be simplified as:

$$\hat{D}(T, T_s) = 1 - S(T, T_s) = \qquad (1)$$
$$\frac{g(T - T_s)}{f(T \cap T_s) + G(T - T_s)} = \frac{\delta f(T \doteq T_s) + \xi f(T \simeq T_s)}{f(T \cap T_s) + \delta f(T \doteq T_s) + \xi f(T \simeq T_s)}$$

It can be observed that $\hat{D}$ reflects the combined appraisal of novelty and conflict in a learning task T.

Now, let us consider the third factor that governs the stimulus selection-complexity. In the context of VLE, complexity of a task T can be measured by the normalized salience of all knowledge points contained in the task, represented by:

$$\Pi(T) = \frac{f(T)}{\max_{T' \in \Gamma} f(T')}, \Gamma = \{T_1, T_2, \ldots, T_n\}$$

where $\Gamma$ is the set of all the predefined tasks in VLE.

Here, we model complexity as a scaling factor for $\hat{D}$, because the value of novelty and conflict can be amplified in very complex tasks and reduced in very simple tasks. For example, searching for an intended piece in a jigsaw puzzle with 1000 pieces is more difficult than searching in one with 10 pieces. Hence, the stimulation level of a learning task T, denoted by $\Omega(T)$ is defined as:

$$\Omega(T) = \Pi(T) \cdot \hat{D}(T, T_s) \qquad (2)$$

where $\Pi(T)$ is the measure of complexity and $\hat{D}(T,T_s)$ reflects the combined appraisal of novelty and conflict in a stimulus as given by Eqn. (1).

2. Mapping from Stimulation Level to Emotions

In psychology, Wundt introduced the Wundt curve, an inverted "U-shape" relationship between the stimulation intensity and arousal of emotions [5]. Three emotions are associated along the spectrum of stimulus intensity, where too little stimulation results in boredom, too much stimulation results in anxiety, and optimal stimulation results in curiosity.

Based on Wundt's theory, the appraisal of curiosity-related emotions is modeled as follows:

If $\Omega(T) \leq \theta_1$ then we call this boredom.
If $\theta_1 < \Omega(T) \leq \theta_2$ then we call this boredom.
If $\theta_2 < \Omega(T)$ then we call this boredom.

where $\Omega(T)$ is the stimulation level of learning task T, obtained from Eqn. (2), and $\theta_1 < \theta_2$ are two thresholds that split the stimulus intensity axis into three emotion regions. The two thresholds determine the curious peer learner's propensity towards each emotion. For example, if $\theta_1$ is close to 0 and $\theta_2$ is close to 1, then the virtual peer learner will become easily curious about any learning task. On the contrary, if $\theta_1$ is very close to $\theta_2$, then the virtual peer learner will have a narrow curious region and become very picky about learning tasks.

REFERENCES

The disclosure of the following references is hereby incorporated by reference in its entirety.
[1] L. Macedo and A. Cardoso. The role of surprise, curiosity and hunger on exploration of unknown environments populated with entities. In: Proc. of Portuguese Conf. on Artificial Intelligence, pages 47-53, 2005.
[2] K. Merrick. Modeling motivation for adaptive nonplayer characters in dynamic computer game worlds. Computers in Entertainment, 5(4):5. 1-32, 2008.
[3] P. D. Scott and S. Markovitch. Experience selection and problem choice in an exploratory learning system. Machine Learning, 12 (1-3):49-67, 1993.
[4] D. E. Berlyne. Conflict, arousal, and curiosity. McGraw-Hill New York, 1960.
[5] W. M. Wundt. Grundz ude physiologischen psychologie. W. Engelman, 1874.
[6] J. Schmidhuber. Curious model-building control systems. In: Proc. of IEEE Intl. Joint Conf. on Neural Networks, pages 1458-1463, 1991.
[7] P. Y. Oudeyer, F. Kaplan, and V. Hafner. Intrinsic motivation systems for autonomous mental development. IEEE Trans. on Evolutionary Computation, 11(2):265-286, 2007.
[8] R. Saunders and J. S. Gero. A curious design agent. In: Proc. Of Conf. on Computer Aided Architectural Design Research in Asia, pages 345-350, 2001.
[9] J. D. Novak and D. B. Gowin. Learning how to learn. Cambridge University Press, 1984.
[10] G. Biswas, K. Leelawong, D. Schwartz, and N. Vye. Learning by teaching: A new agent paradigm for educational software. Applied Artificial Intelligence, 19(3-4):363-392, 2005.
[11] Q. Wu, C. Miao, and Z. Shen. A curious learning companion in virtual learning environment. In: Proc. of IEEE Intl. Conf. on Fuzzy Systems, pages 1-8, 2012.
[12] A. Tversky. Features of similarity. Psychological Review, 84(4):327-352, 1977.
[13] A. G. Barto, S. Singh, and N. Chentanez. Intrinsically motivated learning of hierarchical collections of skills. In Proc. of Intl. Conf. on Development Learn, pages 112-119, 2004.
[14] M. Salichs and M. Malfaz. A new approach to modeling emotions and their use on a decision making system for artificial agents. IEEE Trans on Affective Computing, (99):56-68, 2011.
[15] H. Hu, E. Real, K. Takamiya, M. G. Kang, J. Ledoux, R. L. Huganir, and R. Malinow. Emotion enhances learning via norepinephrine regulation of ampa-receptor trafficking. Cell, 131(1):160-173, 2007.

The invention claimed is:

1. A computer system for assisting a user to perform a task in an environment defined by a first concept map based on a plurality of linked concepts, the computer system comprising:
   a computer processor; and
   a data storage device, storing:
      program instructions operative, when performed by the computer processor, to cause the computer processor to implement a software agent;
      a database storing a second concept map, which records a history of the software agent,
   wherein the program instructions are operative to cause the computer processor:
      to compare the first and second concept maps, and thereby to derive a stimulation measure;
      to compare the stimulation measure to one or more thresholds, to obtain a comparison value;
      to select a behavior for the software agent using a reward function calculated using the comparison value; and
      to implement:
         a state-action mapping unit, the state-action mapping unit receiving the comparison value, and being arranged to learn a state-action mapping using the reward function, whereby the behavior of the software agent is controlled; and
         at least one actuator being controlled by the state-action mapping unit to generate an output for assisting the user to perform the task.

2. The computer system according to claim 1, wherein the actuator additionally operates with a strength which depends on the comparison value.

3. The computer system according to claim 1 further comprising:
   a constraint value unit storing a constraint value indicative of a physical constraint on the actuator, the constraint value being an input to the state-action mapping unit.

4. A method performed by a computer system to implement a software agent for assisting a user to perform a task in a virtual environment defined by a first concept map based on a plurality of linked concepts,
   the method employing a stored second concept map, which records a history of the software agent; and
   the method comprising:
      comparing the first concept map and the second concept map, and thereby deriving a stimulation measure;
      comparing the stimulation measure to one or more thresholds, to obtain a comparison value; and
      selecting a behavior for the software agent using a reward function calculated using the comparison value,
   wherein selecting the behavior for the software agent is performed using a state-action mapping, and
   wherein the method further comprises:
      learning the state-action mapping using a reward value, whereby the behavior of the software agent is controlled; and
      controlling at least one actuator by the behavior of the software agent to generate an output for assisting the user to perform the task.

5. The method according to claim 4, wherein the one or more thresholds comprise a first threshold and a second threshold, the second threshold being higher than the first threshold,
   if the comparison value indicates that the stimulation measure is below the first threshold, or is above the second threshold, the comparison value is negative, and
   if the comparison value indicates that the stimulation measure is between the first threshold and the second threshold, the comparison value is positive.

6. The method according to claim 4, wherein the stimulation measure is calculated by:

calculating a first value derived by a first calculation of a first level of differences between the first concept map and the second concept map using a Tversky's ratio model, calculating a second value derived by a second calculation of a second level of differences between the first concept map and the second concept map using the Tversky's ratio model, calculating a third value derived from a measure of a number of concepts in the first concept map; and forming the stimulation measure by combining the first value, the second value and the third value.

7. The method according to claim 4, wherein the virtual environment is an e-commerce retailer.

* * * * *